Nov. 20, 1928.
K. B. KILBORN
1,692,128
METHOD OF PRODUCING TIRE FLAPS
Filed Oct. 19, 1926     2 Sheets-Sheet 1
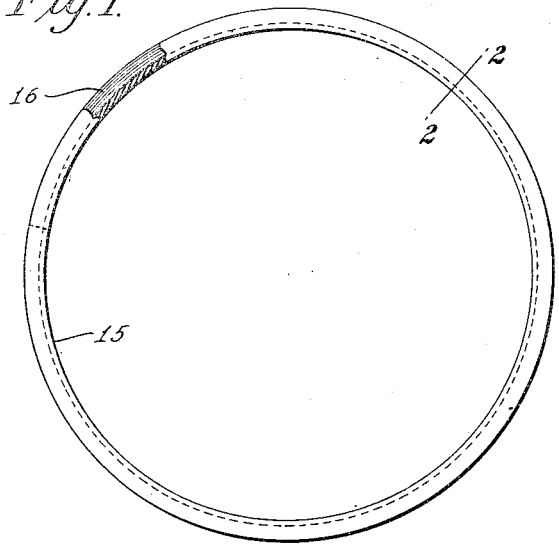
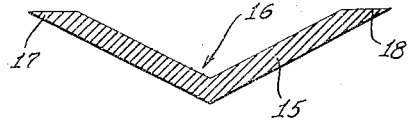
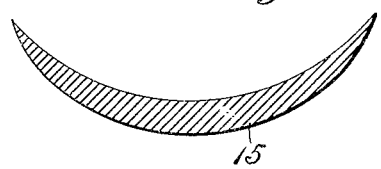
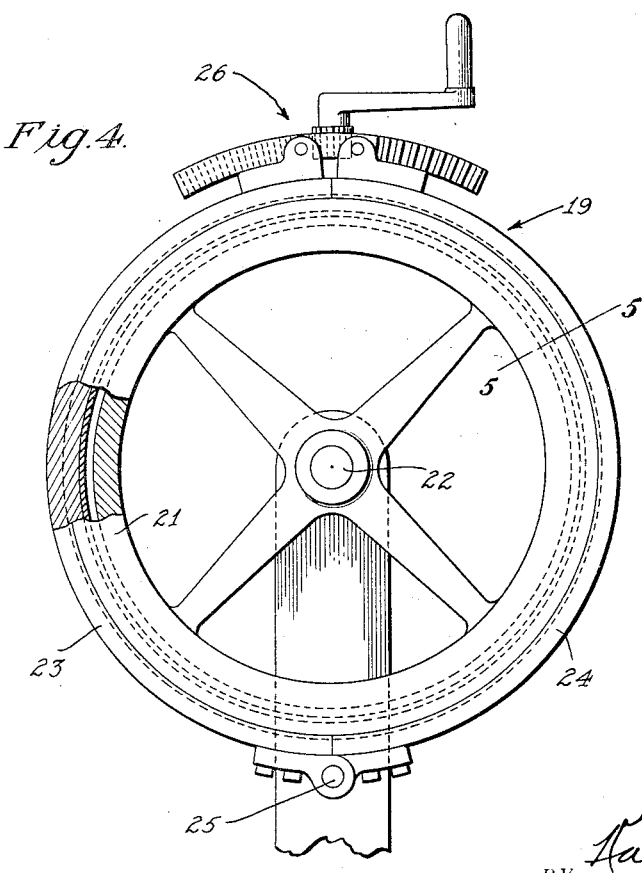
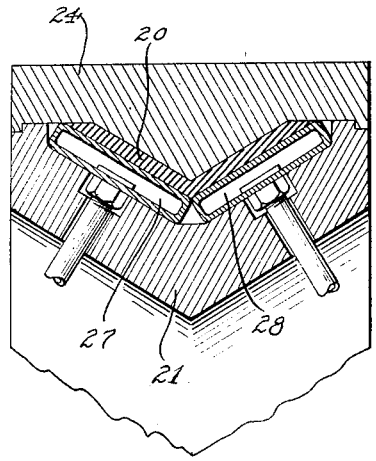
INVENTOR
Karl B. Kilborn
BY
Rogers, Kennedy Campbell
ATTORNEYS Nov. 20, 1928.
K. B. KILBORN
METHOD OF PRODUCING TIRE FLAPS
Filed Oct. 19, 1926   2 Sheets-Sheet 2
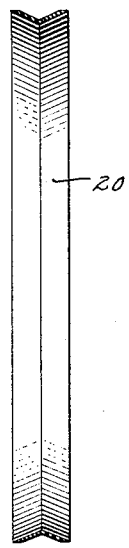
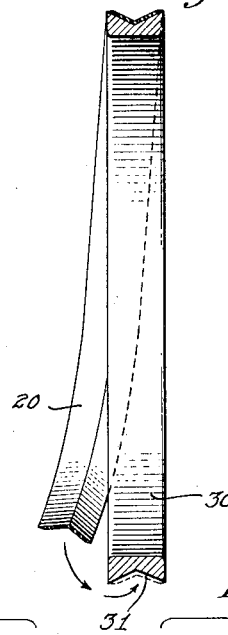
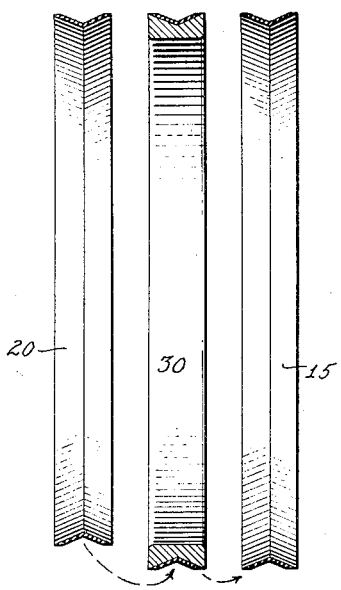
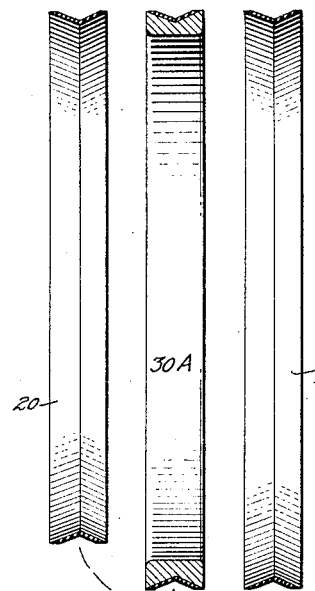
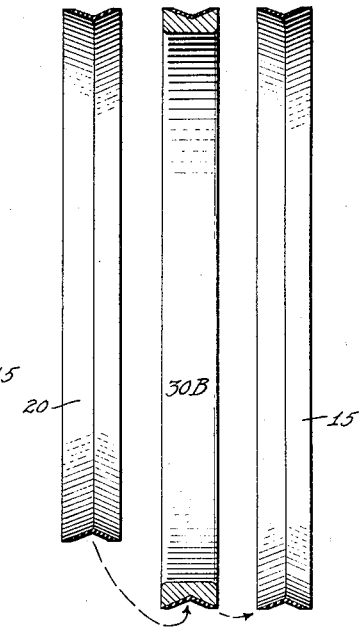
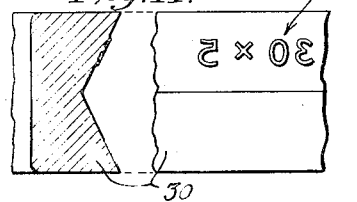
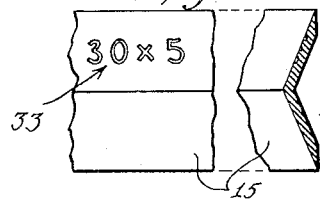

Patented Nov. 20, 1928.

1,692,128

UNITED STATES PATENT OFFICE.

KARL B. KILBORN, OF FAIRLAWN, OHIO, ASSIGNOR TO SEIBERLING RUBBER COMPANY, A CORPORATION OF DELAWARE.

METHOD OF PRODUCING TIRE FLAPS.

Application filed October 19, 1926. Serial No. 142,568.

This invention relates to the art of vulcanizing rubber articles, and has particular reference to an improved method for producing endless bands, such as tire flaps, of definite size and shape.

Tire flaps are produced in a number of different sizes corresponding to the commercial sizes of pneumatic tires, and several different methods have been used in their manufacture. The prior art methods, however, have been expensive and have given rise to objections for a number of other reasons.

For example, according to one method when rubber stock is vulcanized in straight lengths with the proper cross-sectional configuration, and then spliced into an endless circular band, it does not always retain its cross-sectional V or crescent shape.

In another method, relatively long strips of "green" stock are wound about a drum in several layers, the drum being peripherally grooved to shape the rubber, and the stock is vulcanized on the drum in open steam. After vulcanization, the strips of rubber are removed from the drum, cut to proper length, and their ends lapped and secured together. By this method, a relatively high percentage of vulcanized scrap results.

Another method involves cutting sheet stock to proper lengths and splicing the ends together, after which the band so formed is placed on a drum or ring and then put into a vulcanizer and cured. With this method, it is difficult to obtain a smooth surface and uniform edges, and therefore the finished article is not so desirable as it might be.

Still another method involves placing green rubber stock in a vulcanizing mold, in which it is shaped and vulcanized as an endless band or flap. This method produces a very desirable article, but in view of the fact that different molds are required for each of the various sizes, a great financial outlay is necessary for equipment and a large amount of floor space is taken up.

An important feature of the present invention, in its broader aspects, is to provide a method for producing tire flaps more expeditiously and with less cost than has been possible heretofore. To this end, it is proposed to make up the flaps in endless bands of vulcanizable rubber, then to partially vulcanize or semicure the bands in a suitable mold or press in order to give them the required shape and finish, and thereafter to completely vulcanize or finally cure the semicured bands upon suitable drums or rings in open steam. In carrying out the process there is employed a series of drums of different sizes corresponding to those of the commercial flaps, and the partially vulcanized or semicured bands (being made of a smaller uniform diameter) are stretched onto selected drums of the series and their final vulcanization effected in such stretched condition.

Referring to the drawings:

Fig. 1 is an elevation, partly in section, of a tire flap built in accordance with the invention;

Fig. 2 is a transverse sectional view on line 2—2 of Fig. 1;

Fig. 3 is a view similar to Fig. 2 of a different form of flap;

Fig. 4 is a diagrammatic view of a mold in which the flaps are semicured;

Fig. 5 is a transverse sectional view through the mold, on line 5—5 of Fig. 4;

Fig. 6 is a transverse sectional view through a semicured flap;

Fig. 7 is a similar view illustrating the application of the semicured flap to a sizing ring upon which it is finally cured;

Figs. 8, 9 and 10 are views showing three different sizes of tire flaps produced from blanks of a single size;

Fig. 11 is a cross sectional view and fragmentary elevation of a sizing ring, showing the size marking to be impressed upon the tire flaps; and Fig. 12 is a similar view showing a finished flap with its impressed size marking.

As best shown in Figs. 1 and 2, the finished tire flap 15 is in the form of a circular endless band having a peripheral groove 16, and its side edges 17 and 18 preferably tapered to more snugly fit a pneumatic tube within a tire. The form of flap shown in Figs. 1 and 2 is of V shape in cross section, while the other form shown in Fig. 3 is of crescent shape.

In producing a tire flap according to this invention, the green stock, that is, the unvulcanized rubber strip, is formed into an endless band 20 and placed in a vulcanizing mold or press 19 such as illustrated in Figs. 4 and 5. The mold has been shown conventionally as comprising an inner ring section 21, which may be rotatably mounted as at 22, and two outer semicircular ring sections 23 and 24. The mold sections 23 and 24 are hingedly connected together at 25 and provided with mechanical locking means 26 of any desired type. On their inner periphery, the mold sections 23 and 24 are formed with a V-shaped rib to impart the desired groove 16 to the flap, and the section 21 is provided on its inner grooved periphery with air bags 27 and 28 adapted upon inflation, to press the stock 20 uniformly against the V-shaped rib and the adjoining face portions of the mold sections. When the stock is thus confined within the mold, it is heated to partially vulcanize or semicure the rubber, this semicure being sufficient to render the endless band fit for further handling. It is to be noted that the proportions of the mold are such as to make the semicured band slightly smaller in diameter than the smallest tire flap of a graduated series, and the product of the mold is in reality a blank to be finished as a standard flap, the blank having the desired cross sectional configuration and smooth molded surfaces.

The partially vulcanized band 20 is next stretched onto a sizing ring 30 (Fig. 7), preferably made of metal, and which is provided with a grooved periphery 31 of the exact size and shape corresponding to the desired finished flap. While held in this stretched condition on the ring 30, the vulcanization of the band 20 is completed, preferably by an open cure with steam, hot water, or the like. It has been found that within certain limits, the stretching of the band 20 does not materially affect the thickness or width of the rubber. After the final cure has been effected, the band is removed from the ring 30 as a finished tire flap and it will retain the diameter imparted to it by said ring 30.

In practise, a plurality of metal sizing rings 30, 30$^A$, and 30$^B$ are provided as a graduated series corresponding to different commercial sizes of tire flaps and semicured bands 20 of a single size are stretched onto said different size rings. For example, referring to Figs. 8, 9 and 10 by way of illustration, the mold 19 may be employed to form semicured bands 20 which measure 19½ inches in diameter. These bands may be stretched upon a 20$\frac{3}{16}$ inch diameter sizing ring 30 to form a 30 x 5 tire flap 15 (Fig. 8). Bands from the same mold may be stretched on a 21$\frac{3}{16}$ inch diameter sizing ring 30$^A$ to form a 4.95 x 30 tire flap 15 (Fig. 9), and on a 22$\frac{3}{16}$ diameter sizing ring 30$^B$ to form a 5.77 x 32 tire flap 15 (Fig. 10). Similarly a mold of 22½ inch diameter may be employed to produce semicured bands which can be stretched upon sizing rings corresponding to tire rim diameters of 23, 24, 25 and 26 inches.

It will be evident from the foregoing that the financial investment for machinery will be comparatively low since only two sizes of molds are required for the complete range of standard flaps, and furthermore, that the mold production is greatly increased by cutting the time of mold cure from a complete cure to a semicure. The sizing rings 30 can be comparatively light in weight, rendering them easy to handle, and a quantity of them may be placed simultaneously in a vulcanizer for the final cure.

It is desirable to provide the finished flaps with size markings and to this end, the sizing rings 30 may be formed with raised numerals or letters 32 as shown in Fig. 11. When a band 20 is stretched onto the ring, it presses against said raised numerals, and the final vulcanization causes the imprint 33 to be formed in the rubber. In addition to the size indication, the manufacturer's name, trade mark, etc., may be similarly applied to the articles.

The novel method above described constitutes a substantial advance in the art, and obviously it is susceptible of modification in the details, and in the order of the various steps. The right is reserved to make such changes as fall within the scope of the appended claims without departing from the spirit of the invention.

Having thus described my invention, what I claim is:

1. The method of producing a tire flap, which consists in providing a partially vulcanized endless band of rubber having the desired cross sectional configuration, expanding said band to fit it upon the periphery of a similarly shaped metal ring of larger diameter, and completing the vulcanization of the flap while on said metal ring.

2. The method of producing tire flaps, which consists in providing partially vulcanized endless bands of rubber with the desired cross sectional configuration, providing a series of similarly shaped supporting rings of different external diameters, all of said rings being larger in diameter than the partially vulcanized bands, expanding the bands to fit upon the peripheries of selected rings of the series, and completing the vulcanization of the bands while supported on said metal rings.

3. The method of producing a tire flap, which consists in forming an endless band of unvulcanized rubber stock, partially vulcanizing said band in a suitable mold or press, removing the partially vulcanized band from the mold, stretching said band onto a sizing ring of larger diameter, and completing the vulcanization of the band while on said sizing ring.

4. The method of producing a tire flap, which consists in forming an endless band of unvulcanized rubber stock, partially vulcanizing said band in a suitable mold or press, removing the partially vulcanized band from the mold, stretching said band onto a sizing ring of larger diameter and completing the vulcanization of the band by an open cure while on said sizing ring.

5. The method of producing tire flaps, which consists in partially vulcanizing in a suitable mold or press a plurality of endless bands of rubber with the desired cross sectional configuration, all of said bands being of a uniform diameter smaller than that of the finished flaps, providing a series of metal sizing rings of different relative diameters, stretching the partially vulcanized bands onto selected sizing rings of the series, and completing the vulcanization of the bands by an open cure while supported in stretched condition upon said selected sizing rings.

6. The method of producing an elastic tire flap, which consists in making up the flap in an endless band of rubber stock, partially vulcanizing the band in a suitable mold or press in order to give it the required grooved shape and molded finish, stretching said partially vulcanized band onto a correspondingly grooved sizing ring or drum, and completing the vulcanization of the band upon said sizing ring or drum by an open cure.

In testimony whereof, I have affixed my signature hereto.

KARL B. KILBORN.